US008320392B1

(12) United States Patent
Wang et al.

(10) Patent No.: US 8,320,392 B1
(45) Date of Patent: Nov. 27, 2012

(54) METHOD AND APPARATUS FOR PROGRAMMABLE BUFFER WITH DYNAMIC ALLOCATION TO OPTIMIZE SYSTEM THROUGHPUT WITH DEADLOCK AVOIDANCE ON SWITCHES

(75) Inventors: Chi-Lie Wang, Milpitas, CA (US); Jason Z Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 239 days.

(21) Appl. No.: 12/639,554

(22) Filed: Dec. 16, 2009

(51) Int. Cl.
*H04L 12/28* (2006.01)
*H04L 12/56* (2006.01)
(52) U.S. Cl. .......................................... 370/412; 370/413
(58) Field of Classification Search .......... 370/412–419, 370/386–388
See application file for complete search history.

(56) References Cited

U.S. PATENT DOCUMENTS

| 5,974,465 | A | * | 10/1999 | Wong | 709/234 |
|---|---|---|---|---|---|
| 6,791,995 | B1 | * | 9/2004 | Azenkot et al. | 370/436 |
| 6,967,961 | B1 | * | 11/2005 | Chui et al. | 370/413 |
| 7,274,701 | B2 | * | 9/2007 | Boduch et al. | 370/395.4 |
| 7,570,654 | B2 | * | 8/2009 | Muthukrishnan et al. | 370/428 |
| 7,860,120 | B1 | * | 12/2010 | Wang et al. | 370/418 |
| 2003/0076822 | A1 | * | 4/2003 | Shalom et al. | 370/378 |
| 2006/0288159 | A1 | * | 12/2006 | Haruna et al. | 711/113 |
| 2008/0019371 | A1 | * | 1/2008 | Anschutz et al. | 370/394 |
| 2010/0082856 | A1 | * | 4/2010 | Kimoto et al. | 710/45 |
| 2011/0007759 | A1 | * | 1/2011 | Dawson et al. | 370/498 |

\* cited by examiner

*Primary Examiner* — Chuong T Ho
(74) *Attorney, Agent, or Firm* — Heimlich Law, PC; Alan Heimlich, Esq.

(57) ABSTRACT

A method and apparatus for programmable buffer with dynamic allocation to optimize system throughput with deadlock avoidance on switches have been disclosed where a buffer availability is based on a programmable reservation size for dynamic allocation.

20 Claims, 5 Drawing Sheets

METHOD AND APPARATUS FOR PROGRAMMABLE BUFFER WITH DYNAMIC ALLOCATION TO OPTIMIZE SYSTEM THROUGHPUT WITH DEADLOCK AVOIDANCE ON SWITCHES

RELATED APPLICATION

This application is related to application Ser. No. 12/639,887 filed this same date by the same inventors titled "Method and Apparatus for Adaptive Buffer Management for Traffic Optimization on Switches", which is hereby incorporated herein by reference in its entirety including all incorporated references therein.

FIELD OF THE INVENTION

The present invention pertains to switches. More particularly, the present invention relates to a method and apparatus for programmable buffer with dynamic allocation to optimize system throughput with deadlock avoidance on switches.

BACKGROUND OF THE INVENTION

Switches are widely used in systems. For example, the Serial Rapid Input Output (sRIO) Gen2 Switch may be used to meet wireless infrastructure customer's requirements for WCDMA/LTE Base Stations.

There are 4 different priority levels specified in the sRIO standard for Virtual Channel 0 (VC0). Traffic flow may change dynamically in real time as there can be more priority level traffic flowing through within a certain period but on other occasions, very limited priority levels may appear within the switch fabric.

Assigning a fixed amount of buffers to each priority (level) may not be able to utilize all the available buffers efficiently because if there is no traffic with a certain priority, the buffers being allocated to that priority will be wasted. This presents a problem.

BRIEF DESCRIPTION OF THE DRAWINGS

The invention is illustrated by way of example and not limitation in the figures of the accompanying drawings in which.

DETAILED DESCRIPTION

For illustration purposes, the techniques of the present invention will be illustrated using an 18-port Serial Rapid IO (sRIO) Gen2 Switch. The techniques may be applied to other switches and other scenarios. In one embodiment of the invention, an 18-port Serial Rapid IO (sRIO) Gen2 Switch is to be implemented to achieve very high performance (up to 360 Gbit) with minimum latency (<30 ns excluding sRIO protocol stack delay) to meet wireless infrastructure customer's requirements for WCDMA/LTE Base Stations. In order to achieve the target performance under any traffic conditions with the lowest product cost, a technique has been developed which will allow the memory buffers to be allocated dynamically to maximize buffer utilization. In addition, each higher priority can be configured with a programmable reservation size, which will prevent deadlock and retain full bandwidth on higher priority while lower priority encountered congestion with long ACK (acknowledgment) latency from Link Partner.

In one embodiment of the invention, dynamic buffer allocation allows all the available buffers to be allocated to each priority level dynamically therefore all the available buffers can be utilized very efficiently.

In one embodiment of the invention, in order to support deadlock avoidance as defined by the sRIO standard, where a sRIO device needs to accept a higher priority level packet if there is no packet with this priority currently present in the buffer, a scheme has been developed to ensure higher priority packets can always be accepted by reserving at least one additional buffer to each higher priority level.

In one embodiment of the invention, allocating one additional buffer to each higher priority level will allow deadlock avoidance, however, it could cause bandwidth degradation on higher priority traffic with single buffer usage if lower priority is being congested therefore a programmable memory buffer capability will allow more buffers to be allocated to each higher priority level to sustain full bandwidth while lower priority is being congested.

In one embodiment of the invention, a programmable memory buffer capability will allow a longer ACK latency from a Link Partner to be tolerated without causing any bandwidth degradation if sufficient memory buffers can be programmed to each priority level for sustaining maximum throughout.

In one embodiment of the invention, the techniques disclosed will allow memory buffers within a switch to be used most efficiently through dynamic buffer allocation. With programmable capability on each priority level, not only can deadlock be avoided but also full bandwidth can be retained on higher priority traffic while lower priority is being congested. Long ACK delay can also be tolerated if more memory buffers can be reserved for each priority level to retain maximum throughput.

Figure 3:
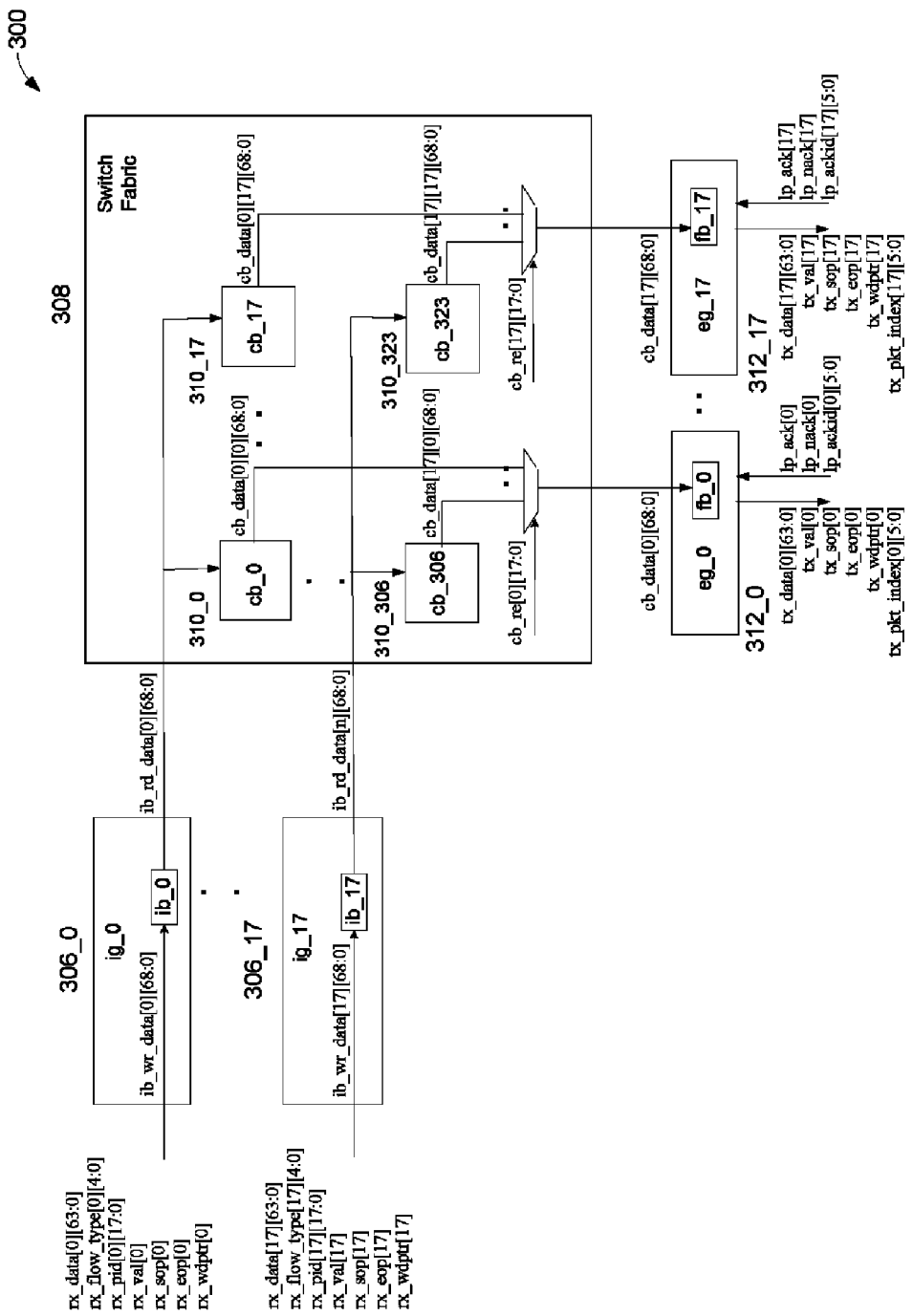
FIG. 3 illustrates one embodiment of the invention showing a data path.

FIG. 3 illustrates, generally at 300, one embodiment of the invention showing a switch data path for an 18-port Buffered Crossbar Switch, it consists of 18 Ingress Ports and each has an Input Buffer (IB) for packet reception. The received packet being stored into Input Buffer will be forwarded to one or multiple (for multicast support) of the 18 Crosspoint Buffers (CB) within a given row that corresponding to 18 Egress Ports. Total of 324 (18×18) CBs will be constructed within Switch Fabric. There are 18 Egress Ports and each has a Final Buffer (FB) that receives the forwarded packet from one of the 18 CBs within a given column that corresponding to 18 Input Ports.

In FIG. 3, at 306_0 through 306_17 are ingress ports (ig_0 through ig_17) each receiving a variety of inputs such as receive data (rx_data[p][63:0]), receive flow type (rx_flow_type[p][4:0]), receive destination port ID (rx_pid[p][17:0]), receive valid cycle (rx_val[p]), receive start of packet (rx_sop[p]), receive end of packet (rx_eop[p]), receive word pointer (rx_wdptr[p]), where p denotes the ingress port number (0 through 17). These inputs are for illustration and are not germane to understanding the invention beyond the concept that there is data received with a priority and it is switched. Each ingress port has an ingress buffer denoted ib_0 through ib_17 and receives an input denoted ib_wr_data[p][68:0], where again p refers to the port number. ib_wr_data[p][68:0] consists of the receive data, rx_data[p][63:0], and for example bit 64 being rx_sop[p], bit 65 being rx_eop[p], bit 66 being rx_wdptr[p], and bits 67 and 68 being reserved. Each an ingress buffer denoted ib_0 through ib_17 can be read and will output buffered data denoted ib_rd_data[p][68:0], where again p refers to the port number. ib_rd_data[p][68:0] consists of the receive data, rx_data[p][63:0], and for example bit 64 being rx_sop[p], bit 65 being rx_eop[p], bit 66 being rx_wdptr[p], and bits 67 and 68 being reserved.

In FIG. 3, at 308 is a switch fabric, having 310_0 through 310_323 crosspoint buffers denoted cb_0 through cb_323.

In FIG. 3, at 312_0 through 312_17 are egress ports (eg_0 through eg_17) each receiving a variety of inputs from the switch fabric 308 (cb_data[q][68:0]), where q denotes the egress port number (0 through 17). Each egress port has an egress buffer denoted fb_0 through fb_17. Each egress port has outputs, for example, transmit data (tx_data[q][63:0]), transmit valid cycle (tx_val[q]), transmit start of packet (tx_sop[g]), transmit end of packet (tx_eop[q]), transmit word pointer (tx_wdptr[g]), and transmit packet index (tx_pkt_index[q][5:0]), where q denotes the egress port number (0 through 17). Each egress port also has inputs received from a link partner, for example link partner ack (lp_ack[q]), link partner nack (lp_nack[q]), and link partner ack ID (lp_ackid [q][5:0]) where again q denotes the egress port number (0 through 17).

In one embodiment of the invention there is a programmable buffer reservation size. Each VC0 priority level (except priority 0) will have its corresponding buffer reservation size register for Input Buffer in Ingress Port (e.g. ib_0 through ib_17 in FIG. 3), Crosspoint Buffer in Switch Fabric (e.g. cb_0 through cb_323 in FIG. 3), and Final Buffer in Egress Port (e.g. fb_0 through fb_17 in FIG. 3) which can be programmed by software. These registers will be used to preserve a number of buffers dedicated for each higher priority level packets if there is no packet with this priority that currently is in the buffer yet. This scheme can prevent deadlock as higher priority packets will always be able to be accepted if they are not present in the buffer yet. In addition, lower priority traffic being congested will not cause bandwidth degradation on higher priority traffic if the desired buffers can be reserved for this priority level to retain full bandwidth. If ACK latency is too long, buffer reservation size for each priority levels can be further increased to maintain full data rate.

Figure 4:
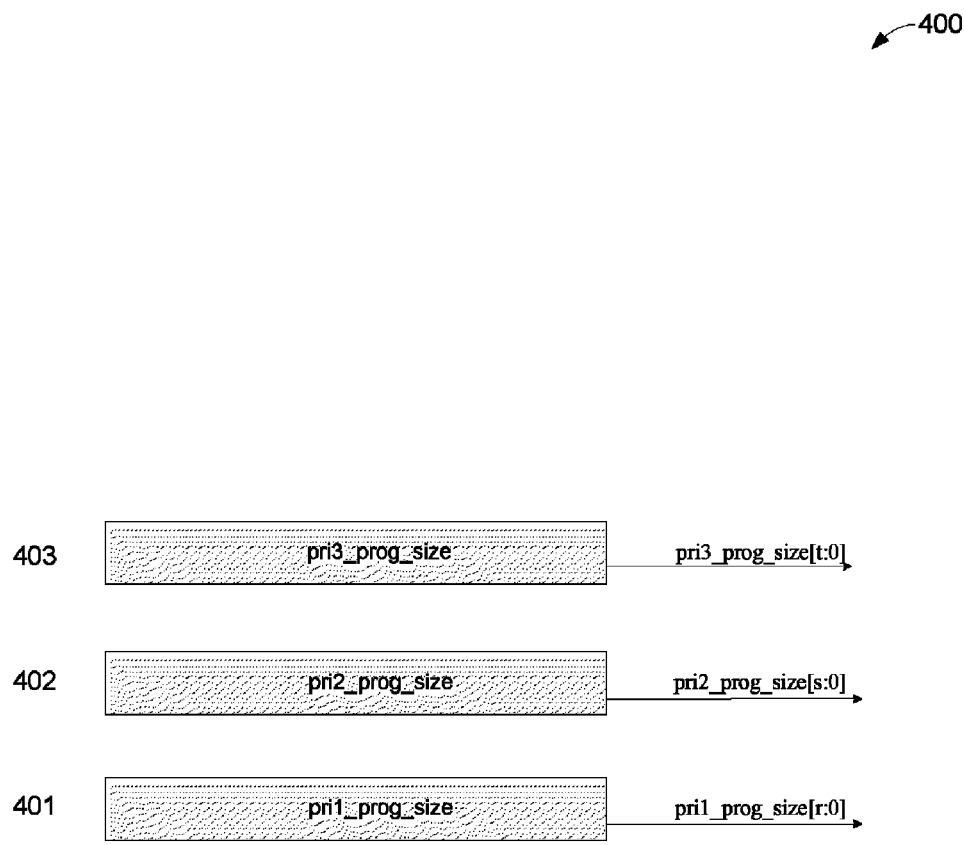
FIG. 4 illustrates one embodiment of the invention showing programmable buffer reservation registers.

FIG. 4 illustrates, generally at 400, one embodiment of the invention showing three representative programmable buffer reservation size registers for 3 different priorities. At 401 is a programmable size for priority 1 (pri1_prog_size) represented by bits pri1_prog_size[r:0]. At 402 is a programmable size for priority 2 (pri2_prog_size) represented by bits pri2_prog_size[s:0]. At 403 is a programmable size for priority 3 (pri3_prog_size) represented by bits pri3_prog_size [t:0].

In one embodiment of the invention, there are three programmable buffer size reservation registers for each priority of 1, 2, and 3 associated with each input buffer (e.g. ib_0 through ib_17 in FIG. 3), crosspoint buffer (e.g. cb_0 through cb_323 in FIG. 3) and final buffer (e.g. fb_0 through fb_17 in FIG. 3).

In one embodiment of the invention, the final buffer (e.g. fb_0 through fb_17 in FIG. 3) has more memory blocks therefore more bits will be used for these registers as more buffers can be reserved for each priority.

In one embodiment of the invention, the input buffer (e.g. ib_0 through ib_17 in FIG. 3) and crosspoint buffer (e.g. cb_0 through cb_323 in FIG. 3) have less memory blocks therefore less bits will be needed for these registers In one embodiment of the invention, these registers can be programmed by software at initialization time based on the number of buffers required to sustain full bandwidth on higher priority traffic while lower priority are being congested.

In one embodiment of the invention, an egress port (e.g. eg_0 through eg_17 in FIG. 3) with longer ACK latency may need more buffers to retain full bandwidth therefore more buffers will need to be programmed/reserved in these registers for each priority levels.

In one embodiment of the invention, certain priority levels may have smaller packet sizes therefore more buffers may need to be programmed/reserved for this priority level with the same ACK latency vs. larger packets with different priority levels.

Figure 5:
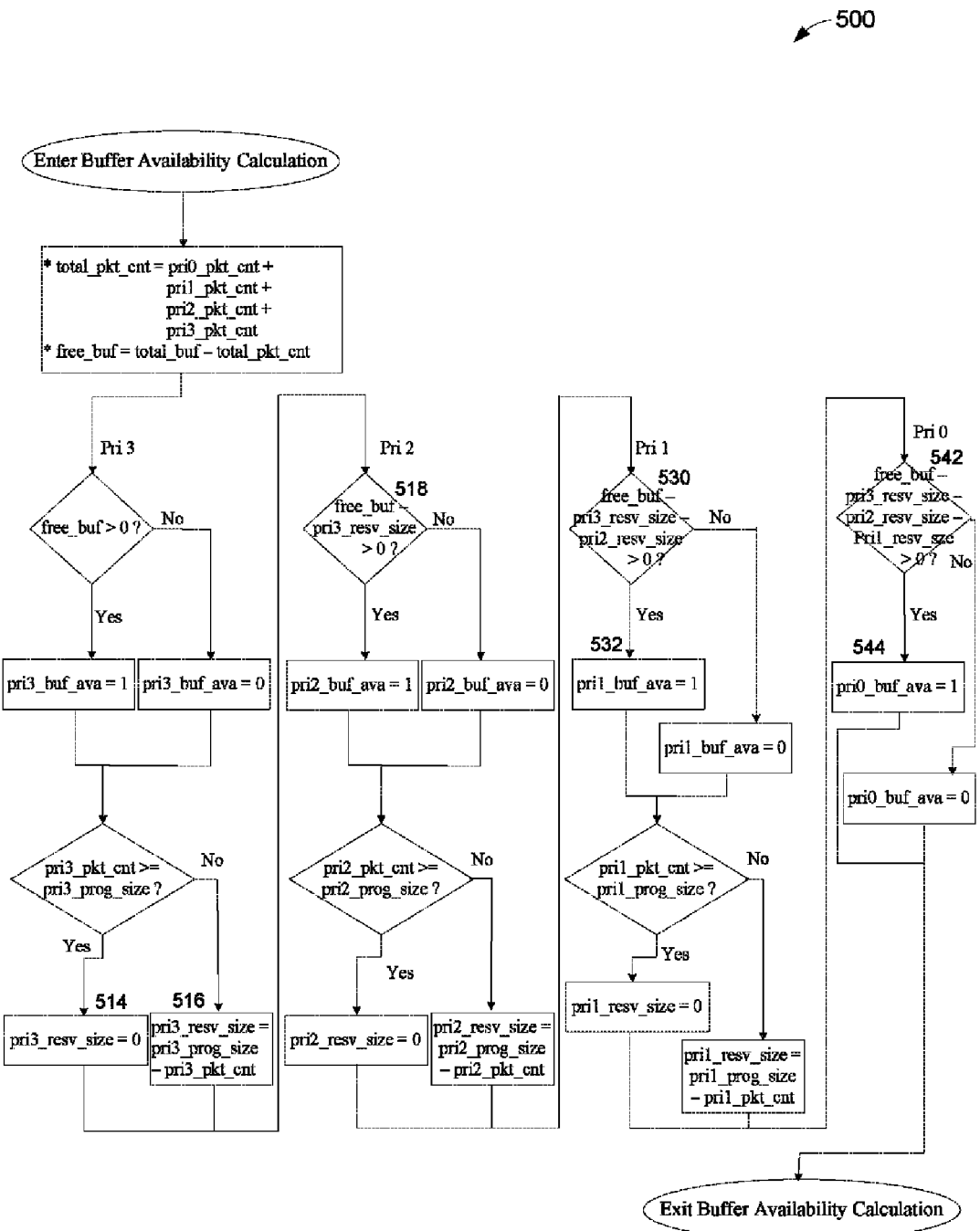
FIG. 5 illustrates one embodiment of the invention showing a buffer availability calculation.

FIG. 5 illustrates, generally at 500, one embodiment of the invention showing buffer availability calculation. It is noted for the reader that the order of highest to lowest priority is 3, 2, 1, 0.

Buffer availability calculation is used to calculate the available buffer space for each priority level on Input Buffer, Crosspoint Buffer and Final Buffer. Based on this indication, each block can determine whether the packet for a specific priority can be accepted and forwarded to the subsequent stage. For instance, if Final Buffer Availability Calculation block indicated that there is no final buffer available to accommodate priority 2 packets; pri2_buf_ava will be de-asserted which will disallow Crosspoint Buffer to forward priority 2 packets into Final Buffer as it doesn't have buffer space available to accept priority 2 packets.

The flow chart in FIG. 5 details one technique to support programmable buffer reservation with dynamic allocation. For instance, in Final Buffer, total packet count will be computed by summing priority 3 packets present, priority 2 packets present, priority 1 packets present and priority 0 packets present. Free Buffer will be derived from "total buffers–total packet count". For priority 3 packets, as long as Free Buffer >0, pri3_buf_ava will be asserted as even there is only one free buffer available, priority 3 packets shall always be allowed for reception. Otherwise (if no single free buffer), pri3_buf_ava will be de-asserted to disallow priority 3 packet transfers from Crosspoint Buffer to Final Buffer.

Referring to FIG. 5, in order to determine whether there is any free buffer available to accommodate priority 2 packets, we'll need to calculate how many priority 3 packets that are currently in the Final Buffer and what is the reserved size being programmed for priority 3 packets first. For instance, if programmed size is 7 and there are four priority 3 packets that are currently being stored in the Final Buffer, 3 more buffers will need to be reserved for accommodating priority 3 packets (pri3_resv_size (3)=pri3_prog_size (7)–pri3_pkt_cnt (4)) (e.g. 516). Priority 2 packets buffer availability can then be determined by "pri2_buf_ava=(Free Buffer–pri3_resv_size)>0" (e.g. 518) after considered the extra buffers need to be reserved for priority 3 packets. If priority 3 packets currently being stored in the Final Buffer are greater than or equal to the programmed reserved size, no more buffers will need to be reserved for priority 3 packets (e.g. 514). As a result, pri3_resv_size will be set to 0 (e.g. 514) for priority 2 packet buffer availability calculation.

Referring to FIG. 5, for priority 1 packets buffer availability calculation, it will be done similarly. Both pri3_resv_size & pri2_resv_size (=pri2_prog_size–pri2_pkt_cnt) will be used to derive pri1_buf_ava (Free Buffer–pri3_resv_size–pri2_resv_size>0) (e.g. 530) as we need to consider how many additional buffers shall be reserved to accommodate priority 3 & priority 2 packets first and if the free buffer remaining is still greater than 0 (e.g. 530), priority 1 packet can be accepted with pri1_buf_ava set to 1 (e.g. 532).

Referring to FIG. 5, for priority 0 packets buffer availability calculation, pri3_resv_size, pri2_resv_size & pri1_resv_size (=pri1_prog_size−pri1_pkt_cnt) will be used to derive pri0_buf_ava (Free Buffer−pri3_resv_size−pri2_resv_size−pri1_resv_size>0) (e.g. 542) as we need to consider how many additional buffers needed to accommodate priority 3, priority 2 & priority 1 packets first and if the free buffer remaining is still greater than 0, priority 0 packet can be accepted with pri0_buf_ava set to 1 (e.g. 544).

FIG. 5 illustrates one technique showing for illustration purposes a serial technique. The invention is not so limited, and one of skill in the art will appreciate that buffer availability may be done in a parallel fashion as well, for example, by the use of up/down counters.

Through the techniques of the present invention, a programmable buffer with dynamic allocation can be used to prevent deadlock, sustain full bandwidth on high priority with congested lower priority traffic and tolerate long ACK latency while still maintaining full data rate.

While various embodiments of the present invention have been illustrated with 4 priority levels (e.g. 0, 1, 2, 3) the invention is not so limited and the techniques disclosed may be used with less than 4 priority levels and with more than 4 priority levels.

Thus a method and apparatus for programmable buffer with dynamic allocation to optimize system throughput with deadlock avoidance on switches have been described.

Figure 1:
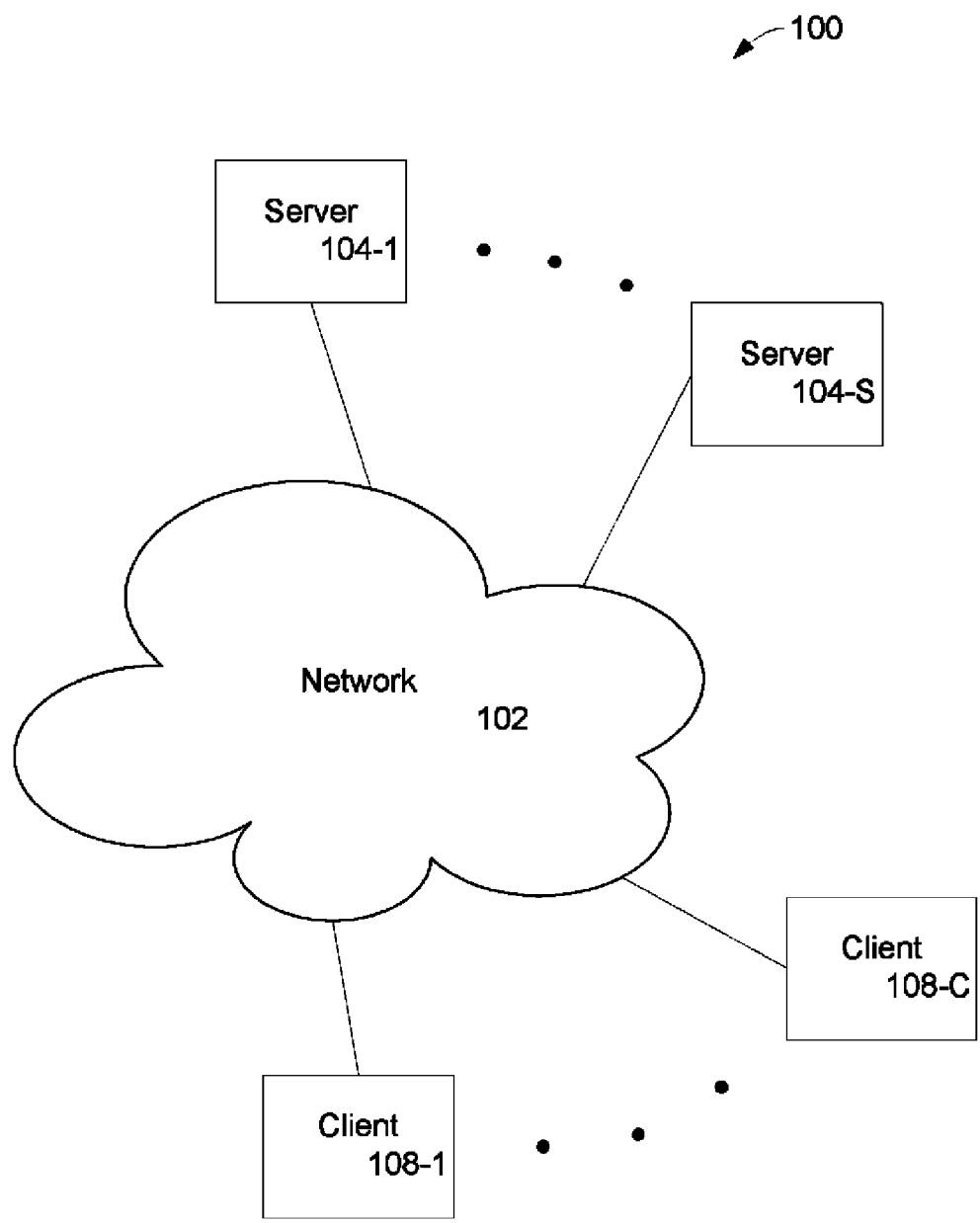
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
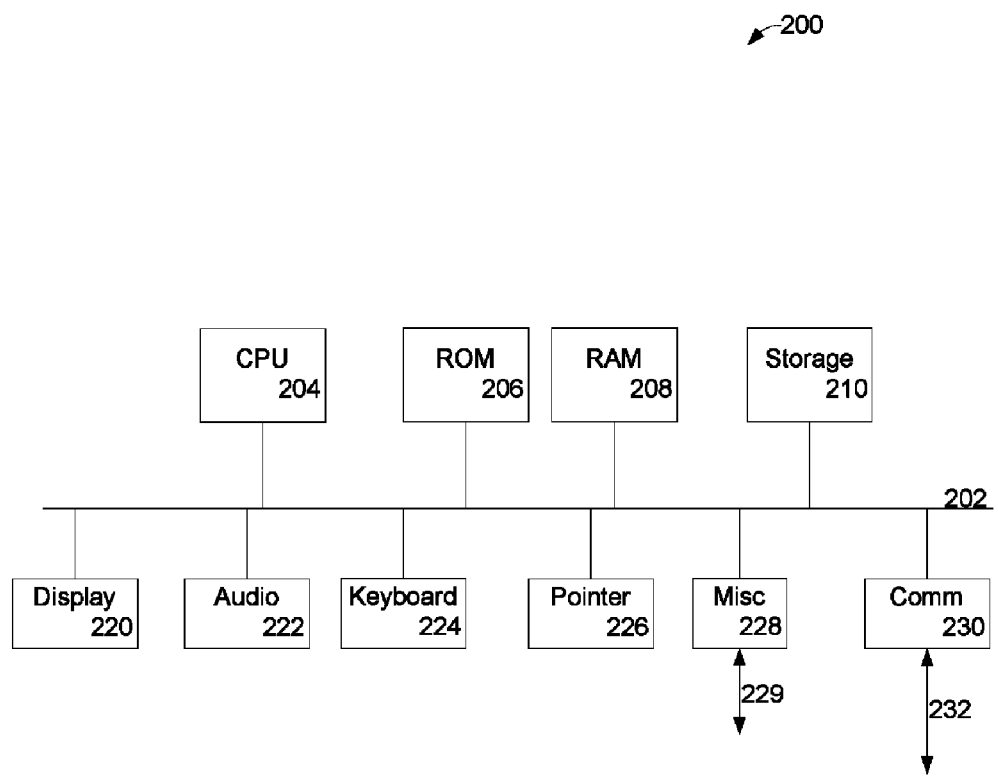
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, ... ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: failsafe is also spelled fail safe, and failsafe; start-up is also spelled startup, and start up; subthreshold is also spelled sub-threshold, and sub threshold; etc.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as " "substantially equal" is used to indicate that they are for all practical purposes equal.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for programmable buffer with dynamic allocation to optimize system throughput with deadlock avoidance on switches have been described.

What is claimed is:

1. A method comprising:
   programming into each of a first plurality of registers a buffer programmable size and a unique buffer priority;
   allocating a first plurality of buffers wherein each of said first plurality of buffers is based on a respective each of said first plurality of registers, said first plurality of buffers each having a size based on said respective buffer programmable size and a priority based on said respective unique buffer priority;

receiving a packet on an ingress port, said packet having packet data and a packet priority;

determining a first buffer availability for said packet; and if said first buffer availability is a yes, then storing said packet data in one of said first plurality of buffers wherein said one of said first plurality of buffers has a same priority as said packet priority;

if said first buffer availability is a no, then not storing said packet data.

2. The method of claim 1 wherein said determining said first buffer availability for said packet further comprises:

calculating a total packet count by summing for each of said first plurality of buffers said received packets that are stored;

calculating a free buffer count by subtracting said total packet count from a total buffer count; and if said free buffer count is greater than zero, then returning a yes for said first buffer availability for a buffer having a highest priority in said first plurality of buffers;

if said free buffer count is not greater than zero, then returning a no for said first buffer availability for said buffer having a highest priority.

3. The method of claim 2 further comprising:

determining if said buffer having said highest priority in said first plurality of buffers has a packet count less than said buffer having said highest priority in said first plurality of buffers buffer programmable size; and if no, then setting a highest priority reservation size to zero;

if yes, then setting a highest priority reservation size to equal said buffer having said highest priority in said first plurality of buffers programmed size minus said buffer having said highest priority in said first plurality of buffers priority packet count.

4. The method of claim 1 wherein said first plurality of registers and said first plurality of buffers and said first buffer availability is associated with a plurality of input buffers.

5. The method of claim 4 further comprising a second plurality of registers and a second plurality of buffers and a second buffer availability associated with a plurality of crosspoint buffers.

6. The method of claim 5 further comprising a third plurality of registers and a third plurality of buffers and a third buffer availability associated with a plurality of final buffers.

7. The method of claim 6 wherein outputs from said first plurality of buffers are in communication with said second plurality of buffers, and wherein outputs from said second plurality of buffers are in communication with said third plurality of buffers, and wherein outputs from said third plurality of buffers are capable of being received by another device.

8. The method of claim 7 wherein a buffer having a highest priority in said first plurality of buffers can utilize any buffer having a lower than said highest priority in said first plurality of buffers.

9. The method of claim 8 wherein a second buffer having a highest priority in said second plurality of buffers can utilize any buffer having a lower than said highest priority in said second plurality of buffers.

10. The method of claim 9 wherein a third buffer having a highest priority in said third plurality of buffers can utilize any buffer having a lower than said highest priority in said third plurality of buffers.

11. The method of clam 1 further comprising allocating one additional buffer to that plurality of buffers having a highest said unique buffer priority.

12. A method comprising:

receiving a plurality of buffer size and unique priority requests;

storing said received plurality of buffer size and unique priority requests;

allocating a plurality of buffers wherein each of said plurality of buffers has a buffer size and unique priority based on said stored received plurality of buffer size and unique priority requests wherein said allocating said plurality of buffers comprises programming into each of said plurality of buffers a buffer programmable size and a unique buffer priority;

receiving a buffer availability request, said received buffer availability request having one of said plurality of unique priority; and returning a buffer availability response.

13. The method of claim 12 wherein said returned buffer availability response is affirmative when said received buffer availability request having one of said plurality of unique priority is a highest of said unique priority and a corresponding said plurality of buffers having said highest of said unique priority has no buffered contents.

14. The method of claim 12 wherein said allocating a plurality of buffers further comprises allocating a single buffer to each of said plurality of buffers having a said unique priority.

15. The method of claim 12 further comprising for each of said allocated plurality of buffers a buffer size reservation register.

16. The method of claim 15 further comprising for each of said allocated plurality of buffers a packet count register.

17. The method of claim 16 wherein said returned buffer availability response for a particular said unique priority is based on said buffer size reservation register and said packet count register.

18. A method comprising:

programming into each of a first plurality of registers a buffer programmable size and a unique buffer priority;

allocating a first plurality of buffers wherein each of said first plurality of buffers is based on a respective each of said first plurality of registers, said first plurality of buffers each having a size based on said respective buffer programmable size and a priority based on said respective unique buffer priority;

receiving a packet, said packet having packet data and a packet priority;

determining a first buffer availability for said packet;

if said first buffer availability is a yes, then storing said packet data in one of said first plurality of buffers wherein said one of said first plurality of buffers has a same priority as said packet priority.

if said first buffer availability is a no, then not storing said packet data;

wherein said determining said first buffer availability for said packet further comprises: calculating a total packet count by summing for each of said first plurality of buffers said received packets that are stored;

calculating a free buffer count by subtracting said total packet count from a total buffer count; and if said free buffer count is greater than zero, then returning a yes for said first buffer availability for a buffer having a highest priority in said first plurality of buffers;

if said free buffer count is not greater than zero, then returning a no for said first buffer availability for said buffer having a highest priority; and determining if said buffer having said highest priority in said first plurality of buffers has a packet count less than said buffer having said highest priority in said first plurality of buffers buffer programmable size; and if no, then setting a highest priority reservation size to zero;

if yes, then setting a highest priority reservation size to equal said buffer having said highest priority in said first plurality of buffers programmed size minus said buffer having said highest priority in said first plurality of buffers priority packet count.

19. The method of claim 18 wherein said first plurality of registers and said first plurality of buffers and said first buffer availability is associated with a plurality of input buffers.

20. The method of claim 19 further comprising a second plurality of registers and a second plurality of buffers and a second buffer availability associated with a plurality of crosspoint buffers.

* * * * *